US006064464A

United States Patent [19]

Yamada

[11] Patent Number: 6,064,464

[45] Date of Patent: May 16, 2000

[54] COPYING MACHINE

[75] Inventor: Hidenori Yamada, Tokyo, Japan

[73] Assignee: Copyer Co., Ltd., Tokyo, Japan

[21] Appl. No.: 09/180,536

[22] PCT Filed: Mar. 11, 1998

[86] PCT No.: PCT/JP98/01000

§ 371 Date: Nov. 10, 1998

§ 102(e) Date: Nov. 10, 1998

[87] PCT Pub. No.: WO98/40794

PCT Pub. Date: Sep. 17, 1998

[30] Foreign Application Priority Data

Mar. 11, 1997 [JP] Japan .................................... 9-74441

[51] Int. Cl.[7] ............................ G03B 27/32; G03B 27/52

[52] U.S. Cl. ............................................. 355/40; 355/27

[58] Field of Search .................................. 355/407, 408, 355/27–29, 40–41, 97; 399/367; 271/258, 265.01

[56] References Cited

U.S. PATENT DOCUMENTS

| | | | |
|---|---|---|---|
| 5,052,669 | 10/1991 | Ueda et al. | 271/3.1 |
| 5,079,598 | 1/1992 | Kaneko et al. | 355/309 |
| 5,095,370 | 3/1992 | Takada et al. | 358/300 |
| 5,099,291 | 3/1992 | Yoshioka et al. | 355/316 |
| 5,515,153 | 5/1996 | Tokunoh | 355/320 |
| 5,822,673 | 10/1998 | Tanio | 399/369 |
| 5,828,932 | 10/1998 | Ohata et al. | 399/209 |

FOREIGN PATENT DOCUMENTS

| | | |
|---|---|---|
| 56-017360 | 2/1981 | Japan . |
| 62-017770 | 1/1987 | Japan . |
| 62-110934 | 7/1987 | Japan . |
| 1-118926 | 8/1989 | Japan . |
| 1-304470 | 12/1989 | Japan . |
| 2-204248 | 8/1990 | Japan . |
| 3-114072 | 5/1991 | Japan . |
| 4-089739 | 3/1992 | Japan . |
| 4-211277 | 8/1992 | Japan . |
| 6-348090 | 12/1994 | Japan . |
| 7-271113 | 10/1995 | Japan . |

*Primary Examiner*—Safet Metjahic
*Assistant Examiner*—Hung Henry Nguyen
*Attorney, Agent, or Firm*—Dellett and Walters

[57] ABSTRACT

A copying machine such that both successive automatic sheet feeding and sheet through operation are possible. Two independent units of an original transporting unit (DF) (61) and automatic sheet feeding unit (AF) (600) respectively fulfill an automatic sheet feeding function for successively feeding a plurality of originals (by taking out the originals one by one) and an original transporting function for moving an original to an original supporting plate from a sheet feeding position. The control of the DF (61) is basically made by a controller in the main body of the copying machine and the control of automatic sheet feeding of the AF (600) is made by a controller in the AF (600). When the AF (600) performs automatic sheet feeding, the AF (600) controls the original transporting operation of the DF (61) in place of the main body of the copying machine. The AF (600) has a sheet feeding port (301) for successive automatic sheet feeding and a sheet feeding port (302) for single sheet feeding and an original can be inserted directly into the original inserting port (23) of the DF (61) through the second sheet feeding port (302).

10 Claims, 20 Drawing Sheets

FIG. 8 (a) IN JAM OCCURRENCE

| CODE 1 | CODE 0 | CONTENTS |
|---|---|---|
| L | L | DF/AF SIMULTANEOUS ORIGINAL INSERTION JAM |
| L | H | SHEET EJECTION SENSOR JAM |
| H | L | DF SHEET LEADING-EDGE SENSOR JAM |
| H | H | ORIGINAL INSERTION SENSOR JAM |

FIG. 8 (b) IN REPORTING ORIGINAL SIZE

| CODE 1 | CODE 0 | CONTENTS |
|---|---|---|
| L | L | A3S or 12×18S |
| L | H | B4S or 11×17S |
| H | L | A4S |
| H | H | B5S, LEGAL S or LETTER S |

ORIGINAL TRANSPORTATION STARTED WHEN ORIGINAL INPUT SENSOR IS TURNED ON

TRANSPORTATION MOTOR STOPS WHEN SHEET EJECTION SENSOR S5 IS TURNED ON

ROTATION OF TRANSPORTATION MOTOR REVERSED TO SET ORIGINAL IN POSITION

COPY OPERATION STARTED

EJECTION OF ORIGINAL

OPTICAL SYSTEM MOVED TO SHEET THROUGH POSITION

TRANSPORTATION MOTOR STARTED WHEN ORIGINAL INPUT SENSOR IS TURNED ON

ORIGINAL TRANSPORTATION OPERATION STARTED IN MAIN BODY

ORIGINAL TRANSPORTED ACCORDING TO COPY SCALE FACTOR

EJECTION OF ORIGINAL

FIG. 14

| SIZE OF ORIGINAL | SIZE DETECTION SENSOR (Q904) | NUMBER OF DF MOTOR (M901) PULSES |
|---|---|---|
| A3 | ON | 3133～3344 |
| A4R | OFF | 3133～3344 |
| B4 | ON | 2711～2922 |
| B5R | OFF | 2711～2922 |
| A4 | ON | 2215～2426 |
| B5 | OFF | 1920～2131 |

COPYING MACHINE

TECHNICAL FIELD

The present invention relates to a copying machine, and more particularly to a method and a system for automatic sheet feeding and transportation.

BACKGROUND ART

Conventionally, a copying machine is known which includes an automatic sheet feeding unit (or Auto-Document Feeder (ADF)) which successively feeds a plurality of originals to be copied, one at a time, from the original tray on to the original supporting plate.

In general, the automatic sheet feeding unit includes a sheet feeding section which picks up and feeds a plurality of originals one by one and a transportation section (transportation belt) which transports the picked-up original to the original supporting plate.

This automatic sheet feeding unit allows a user to make copies of a plurality of originals successively in response to a user's single instruction.

Also known is a copying machine which performs what we call a sheet through operation in which the original scanner (normally composed of an optical system) is not moved but fixed at a predetermined position below the original supporting plate and a single-sheet original, inserted through the original inserting port, is moved over the fixed original scanner. This sheet through operation is useful in copying a long-length original that is longer than the length of the original supporting plate in the original transportation direction.

However, the automatic sheet feeding unit described above can feed only an original shorter than the original supporting plate. It is therefore not practical to implement the sheet through operation in the conventional automatic sheet feeding unit. That is, conventionally, the successive automatic sheet feeding operation and the sheet through operation for a long-length original have been performed by separate mechanisms, and no copying machine has had these two mechanisms at the same time.

It is an object of the present invention to provide a copying machine that can perform both the successive automatic sheet feeding operation and the sheet through operation.

It is another object of the present invention to provide a mechanism structure and a control method suited for such a copying machine.

DISCLOSURE OF INVENTION

The copying machine according to the present invention is a copying machine, in which an original scanner below an original supporting plate moves relatively with respect to an original on the original supporting plate to scan and copy the original, the copying machine comprising a copying machine main body having the original supporting plate on which the original is placed; an original transporting unit having an original inserting port for transporting the original inserted into the original inserting port onto the original supporting plate, the original transporting unit being installed on the copying machine main body; first control means included in the copying machine main body for controlling an original transportation operation of the original transporting unit; and an automatic sheet feeding unit including automatic sheet feeding means for successively feeding a plurality of originals into the original inserting port and second control means for controlling an original transportation operation of the original transporting unit in place of the first control means during an operation of the automatic sheet feeding means, the automatic sheet feeding unit being optionally installed on the copying machine main body.

With this configuration, the copying machine according to the present invention assigns the automatic sheet feeding function which feeds a plurality of originals (one at a time) successively and the original transporting function which moves the original from the sheet feeding position to the original supporting plate, to two independent units (the original transporting unit and the automatic sheet feeding unit which will be described later). In addition, the control of the original transporting unit is performed by the copying machine main body (first control means). This configuration, in which the automatic sheet feeding unit is optional, reduces the cost of the copying machine having only the standard function.

When the automatic sheet feeding unit is installed, the processing load on the control means (first control means) within the copying machine main body is too high if the copying machine main body must perform also the automatic sheet feeding (control of a sheet feeding motor). Therefore, the automatic sheet feeding unit has a dedicated control means. Because the operations of the automatic sheet feeding unit and the original transporting unit are closely related with each other, the control means (second control means) within the automatic sheet feeding unit controls the original transporting operation of the original transporting unit in place of the copying machine main body when the automatic sheet feeding is performed by the automatic sheet feeding unit. In this event, to prevent the control of the original transporting unit performed by the automatic sheet feeding unit from conflicting with that performed by the copying machine main body, it is desirable that the control of the original transporting unit performed by the copying machine main body be suppressed during the automatic sheet feeding.

The original transporting unit also serves as a cover of the original supporting plate, the cover capable of being closed and opened on the original supporting plate.

The original transporting unit has an endless transportation belt which rotates in contact with the original supporting plate and a first motor for driving the transportation belt.

The automatic sheet feeding unit has an original separating means for separating originals, one at a time, from a stack of the plurality of originals and a second motor for driving the original separating means.

Preferably, the first control means has a first operation mode in which the original scanner is moved with respect to the original on the original supporting plate to read the original and a second operation mode (sheet through mode) in which the original scanner is fixed at a predetermined position below the original supporting plate and in which the original inserted from the original inserting port is moved with respect to the fixed original scanner to read the original. This configuration allows the original transporting unit not only to perform a normal copy operation but also to perform a copy operation of a long original.

More specifically, the automatic sheet feeding unit has a first sheet feeding port through which the plurality of originals are successively fed, a second sheet feeding port through which a single original is fed, and first and second original sensors for detecting that the original is inserted from the first and second sheet feeding ports respectively, wherein the second control means controls the original transporting unit when the first original sensor detects that the original has been inserted from the first sheet feeding port, and wherein the first control means controls the original transporting unit when the second original sensor detects that the original has been inserted from the second sheet feeding port.

In this configuration, although an original inserted from the first sheet feeding port passes through the successive sheet feeding mechanism (for example, a mechanism which picks up and feeds originals, one at a time), an original inserted from the second sheet feeding port can get directly into the original inserting port of the original transporting unit without passing through that mechanism. Therefore, when an original is inserted from the second sheet feeding port, the control of the original transporting unit can be performed by the first control means. There is no need for the automatic sheet feeding unit (second control means) to perform the operation in the second operation mode. This makes the configuration of the second control means simpler. More specifically, when the control means is implemented by programs executed by a CPU, this configuration eliminates the need for the program for the second operation mode, thus reducing the amount of the ROM or the storage area in which the programs are stored.

Preferably, the original transporting unit has a first sheet ejection path via which the original is reversed, a second sheet ejection path via which the original is not reversed, and a sheet ejection path switching means for switching between the first ejection path and the second sheet ejection path, wherein the second control means requests the sheet ejection path switching means to select the first sheet ejection path according to an output from the first original sensor. Therefore, when a plurality of originals are successively fed from the first sheet feeding port, they are ejected and stacked, via the first sheet ejection path, onto the tray provided on the top of the machine, in the order in which they were stacked. When an original is fed from the second sheet feeding port through which a single original is inserted, there is a possibility that the original is long. Therefore, the second sheet ejection path is selected and the original is normally ejected onto the tray provided on the side of the machine.

The copying machine further comprises, at the original inserting port of the original transporting unit, a sheet feed roller for holding the original between the cover of the original supporting plate and the copying machine main body and for transporting the original, the cover capable of being opened and closed. This configuration enables the original to be released when the original supporting plate cover is opened, making it easier to take a corrective action when an original jam occurs at the original inserting port of the original transporting unit.

The second sheet feeding port is preferably provided as a gap between the original transporting unit and the automatic sheet feeding unit. When a long original is inserted from the second sheet feeding port and, then, an original jam occurs with the original extending between the sheet feeding port and the sheet ejection port, this configuration prevents the original from being damaged even when the original cover, which comprises the original transporting unit, is opened. (If a long original is unfreely held in the automatic sheet seeding unit, the original, held by both the sheet ejection port and the sheet feeding port of the automatic sheet feeding unit, would be pulled and damaged when the original cover is opened.)

BRIEF DESCRIPTION OF DRAWINGS

FIGS. 8 (*a*) and (*b*) are diagrams showing the contents of the codes sent from the AF to the main body of the copying machine when the automatic sheet feeding unit (AF) is installed on the copying machine of FIG. 1;

FIG. 14 is a diagram showing the sizes of an original detected by the sensors in the original transporting unit (DF);

BEST MODE FOR CARRYING OUT THE INVENTION

An embodiment according to the present invention will be described in detail with reference to the attached drawings.

Figure 1:
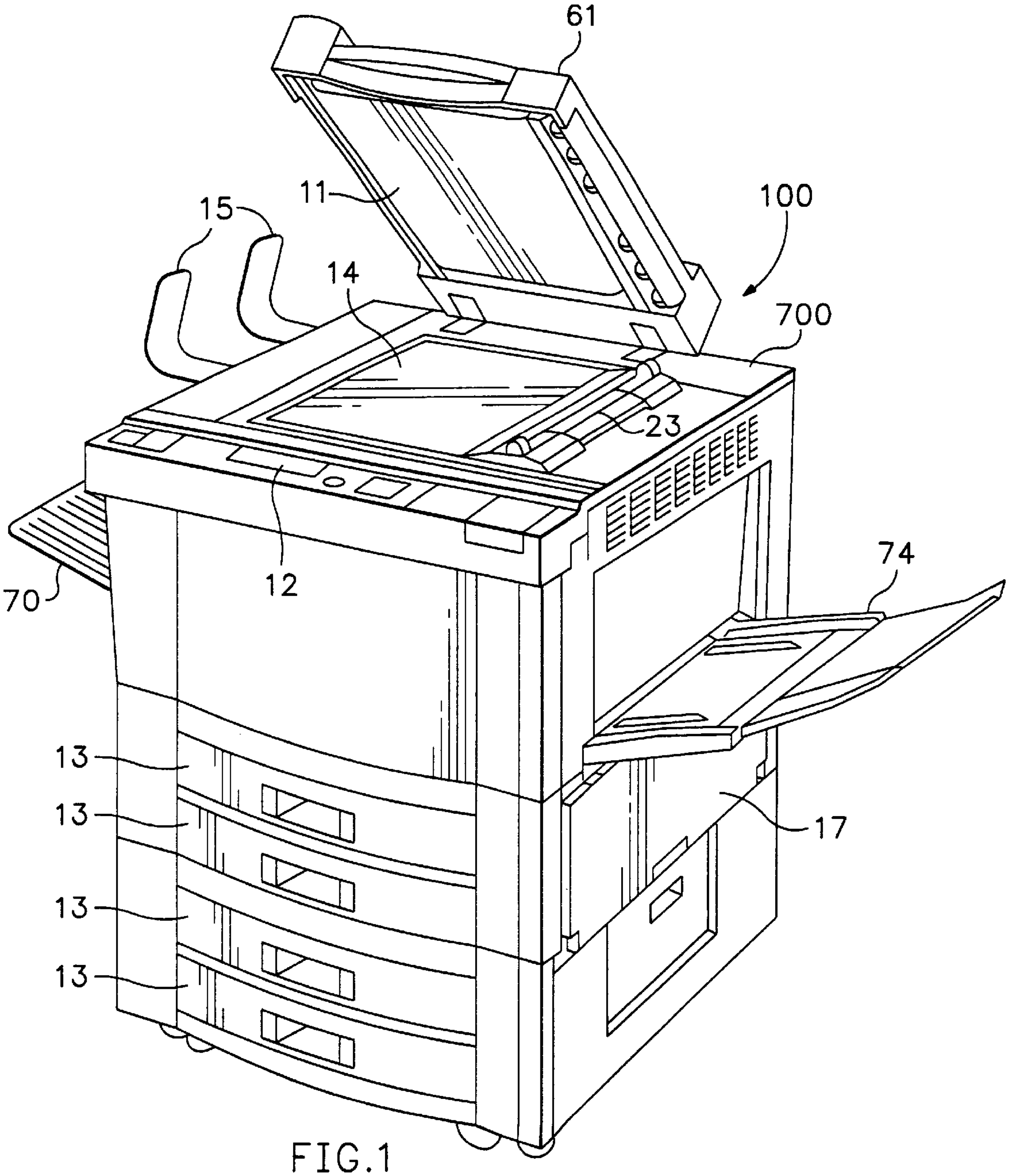
FIG. 1 is a perspective view of a copying machine (AF not installed) to which the present invention is applied.

FIG. 1 is an external view of an electro-photographic copying machine to which the present invention is applied.

On this copying machine 100, when a user puts an original on an original supporting plate 14 which is on the top of the copying machine main body 700, and closes an original transporting unit 61 which also serves as an original cover, and then presses a copy start button (not shown) on an operation panel 12, an original scanner (706 in FIG. 6: scanner optical system 64 in FIG. 5) included in the copying machine main body 700 moves below the original supporting plate 14 for scanning the original. A toner image corresponding to an image read through the scanning is transferred and fixed, through the electrostatic copying process, onto a sheet which is supplied selectively from a front tray 13, a manual-insertion tray 74, or a roll sheet supply section 17, and the copied sheet is ejected to a copied sheet ejection tray 70. The manual-insertion tray 74, shown in a ready-for-use state in FIG. 1, may be stored in a side space of the copying machine main body 700 when not used.

The copying machine 100 shown in FIG. 1 allows the user not only to manually put a sheet on the plate but also to feed a single sheet of original through an original inserting port 23 or to feed a plurality of originals sequentially and automatically through an automatic sheet feeding unit 600 which will be described later.

Figure 2:
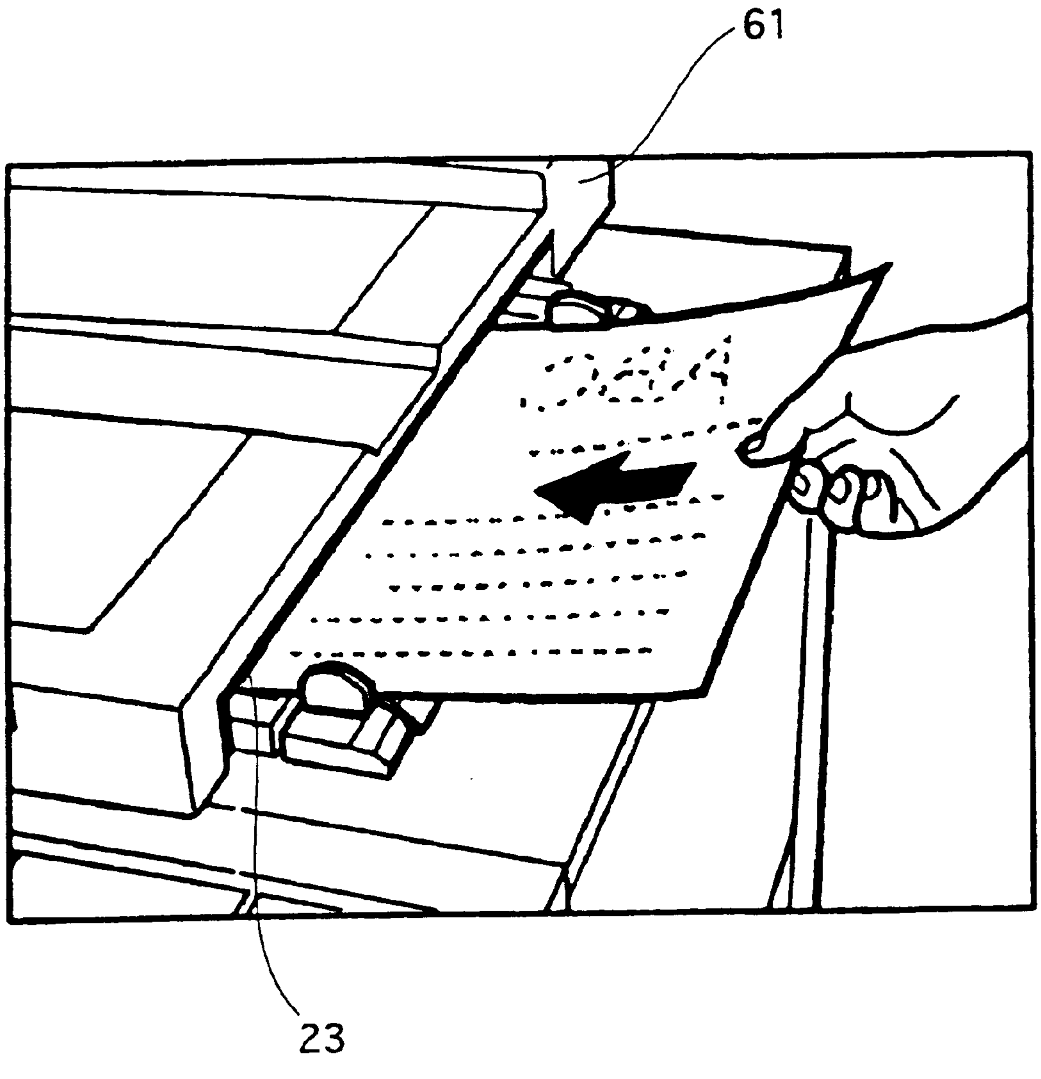
FIG. 2 is a diagram showing an original transporting unit (DF) of the copying machine shown in FIG. 1.

When using the original inserting port 23 of the original transporting unit 61, the copy operation may be performed either in a normal mode in which the original is fixed at a predetermined position for reading or in a sheet through mode. In the sheet through mode, the original scanner is fixed below, and approximately at the center of, the original supporting plate 14 and, as shown in FIG. 2, the original is automatically pulled into the copying machine through the original inserting port 23 with the face of original down and the original transporting unit (original cover) 61 closed. The original is then transported by a transportation belt: 11 (FIG. 2) at a fixed speed over the original supporting plate 14 without stopping and is ejected to an original ejection tray 15. During this transportation process, the image of the original is read. The sheet through mode has the following advantages: (a) an original longer than the length of the original supporting plate 14 may be copied and (b) the time needed for the original scanner to read one sheet of original is reduced because the original scanner need not move back and forth.

Figure 4:
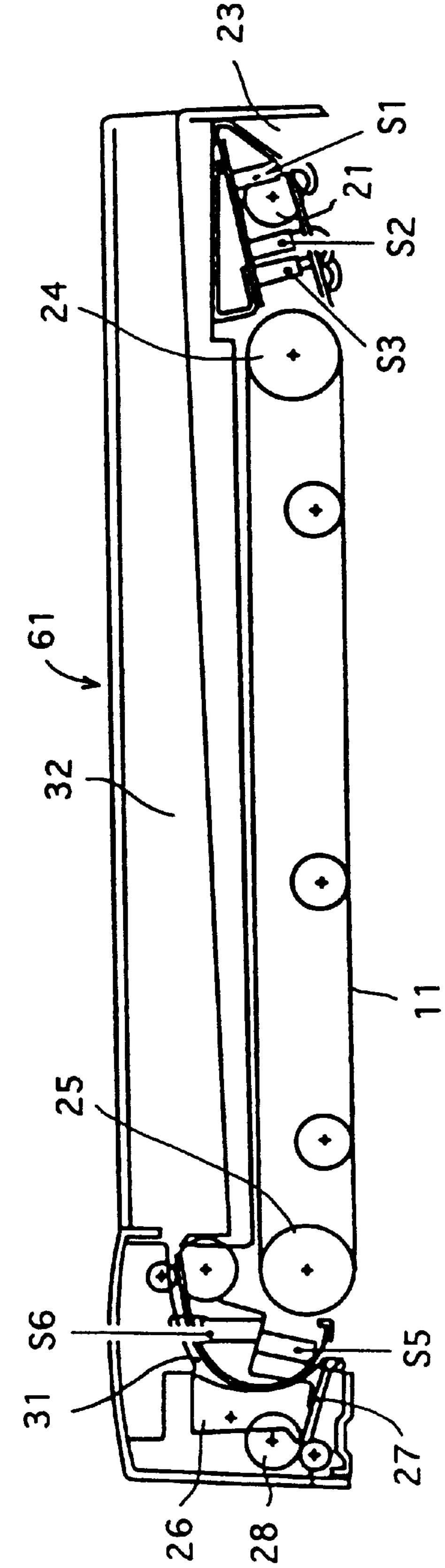
FIG. 4 is a sectional view showing an internal structure of the original transporting unit shown in FIG. 1.

FIG. 4 shows a general internal structure of the original transporting unit (DF) 61. The original transporting unit 61 includes a feed roller 21 which feeds an original into the copying machine and a transportation belt 11 which transports the original, through frictional force, by holding it against the original supporting plate 14. In addition, the original transporting unit 61 includes an original input sensor S1, a sheet feed sensor S2, and an sheet leading-edge sensor S3 in the up-stream of the transportation path, and sheet ejection sensors S5 and S6 in the down-stream thereof. The down-stream is divided into two paths: a first sheet ejection path 31 shown in the upper part of FIG. 4 and a second sheet ejection path 27 shown in the left part. The first sheet ejection path 31 is used when only the original transporting unit 61 is installed or used to copy a single sheet when the automatic sheet feeding unit 600 is also installed. The second sheet ejection path is used when successive automatic sheet feeding is performed by the automatic sheet feeding unit 600. These two paths 27 and 31 are switched by the pivotal movement of a path switching pawl 26. The detailed operation of the original transporting unit 61 will be described later. The feed roller 21, which is opposed to an idle roller of the copying machine main body 700, transports an original by holding the original between the original transporting unit 61 and the copying machine main body 700.

Figure 3:
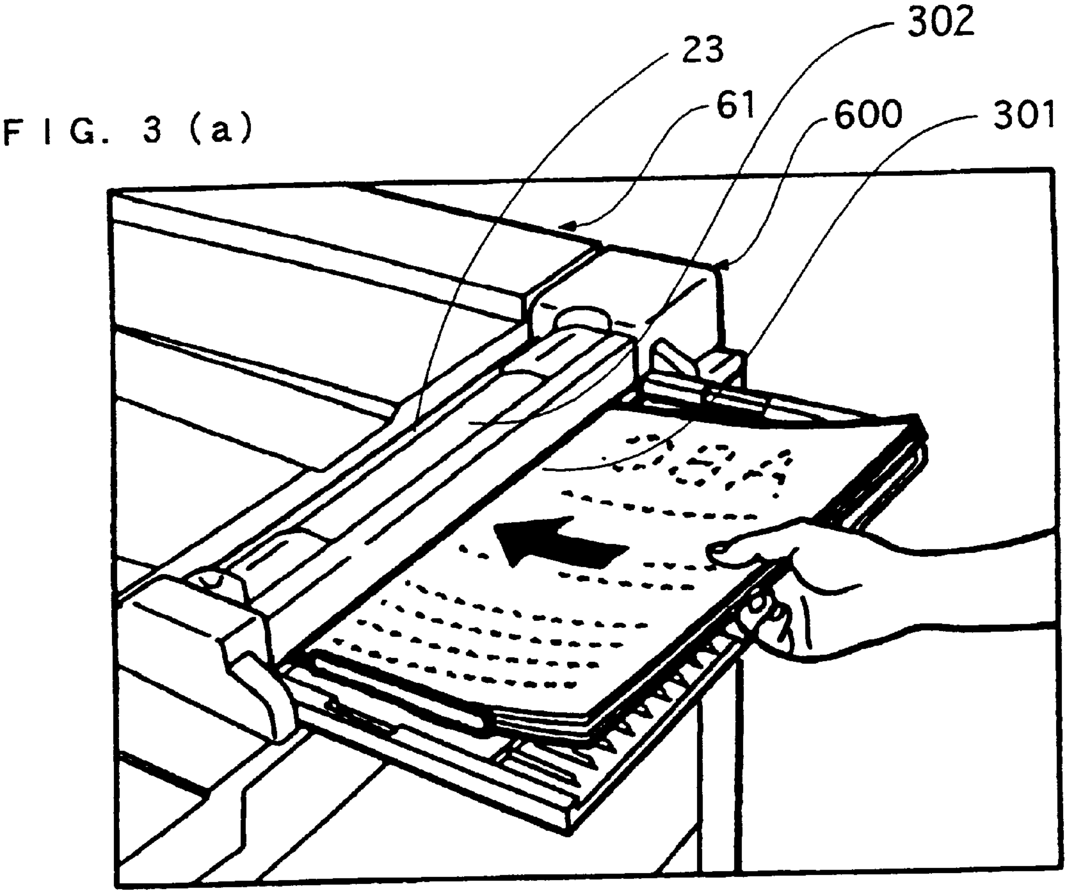
FIGS. 3(*a*) and 3(*b*) are diagrams showing an automatic sheet feeding unit (AF) attached to the original transporting unit (DF) of the copying machine shown in FIG. 1.
Figure 3:
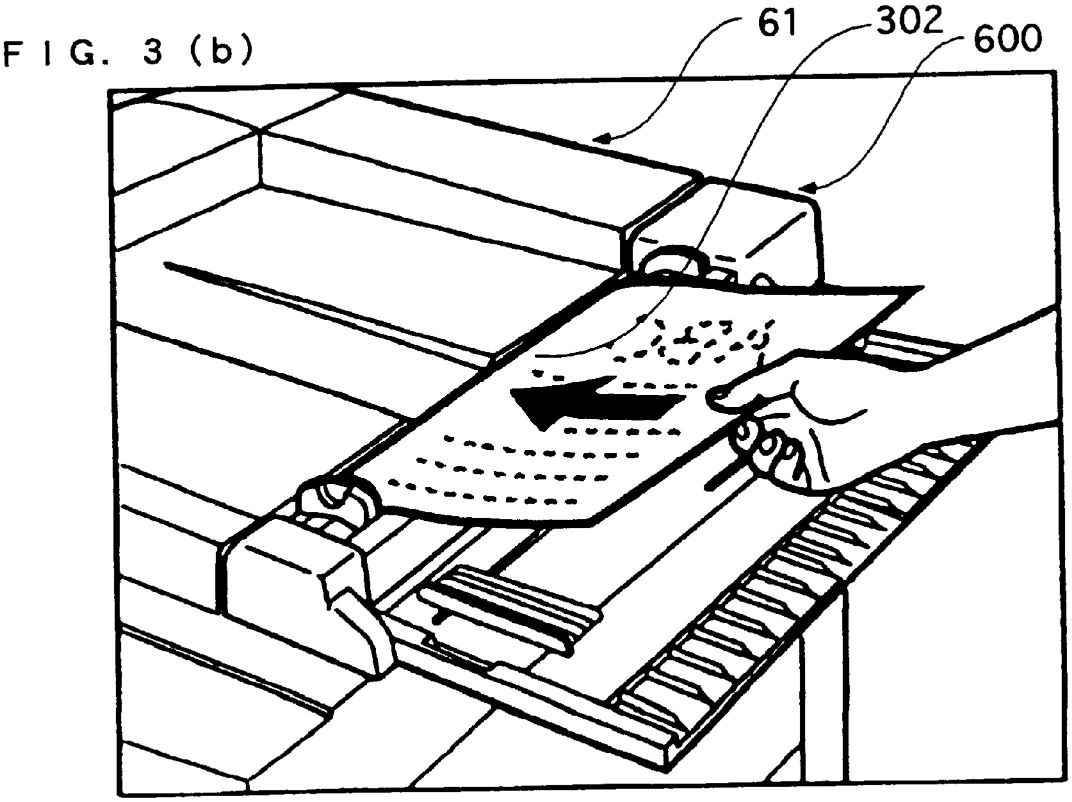

In addition to the original transporting unit 61, the copying machine 100 of this embodiment may also have the automatic sheet feeding unit 600 installed optionally as shown in FIG. 3 (*a*). This automatic sheet feeding unit 600 automatically and successively feeds a plurality of originals, one at a time. During the successive automatic sheet feeding, an original pulled in by the automatic sheet feeding unit 600 stops at a predetermined position on the original supporting plate 14 and is read as the original scanner moves. That is, the copy operation is performed in the normal mode which is different from the sheet through mode described above. The automatic sheet feeding unit 600 has a first sheet feeding port 301 shown in FIG. 3 (*a*) as well as a second sheet feeding port 302 shown in FIG. 3 (*b*). The second sheet feeding port 302 is coupled directly to the original inserting port 23 (FIG. 1) without any rollers intervened. Therefore, with the automatic sheet feeding unit 600 installed, the successive sheet feeding mode and the single sheet feeding mode (especially, the sheet through mode) may be switched to use, by simply changing the feeding port.

In addition, because of the structure of the second sheet feeding port 302 which is provided by a gap between the original transporting unit 61 and the automatic sheet feeding unit 600 and the structure of the feed roller 21 of the original transporting unit 61 described above, the original inserted into the second sheet feeding port 302 is released at the feeding port when the original transporting unit 61 (original cover) is opened. Therefore, when the original transporting unit 61 is opened, it is avoided that the long original is held by both the sheet feeding port and the sheet ejection port. As a result, the original is not damaged mistakenly.

In this embodiment, the automatic sheet feeding unit 600 is mounted on the main body of the copying machine 100. A sensor not shown in the figure detects whether or not the automatic sheet feeding unit 600 is installed, so that a control means (CPU 701 in FIG. 7) can recognize it.

A user who does not require the successive automatic sheet feeding function may install only the original transporting unit 61 without installing the automatic sheet feeding unit 600.

Figure 5:
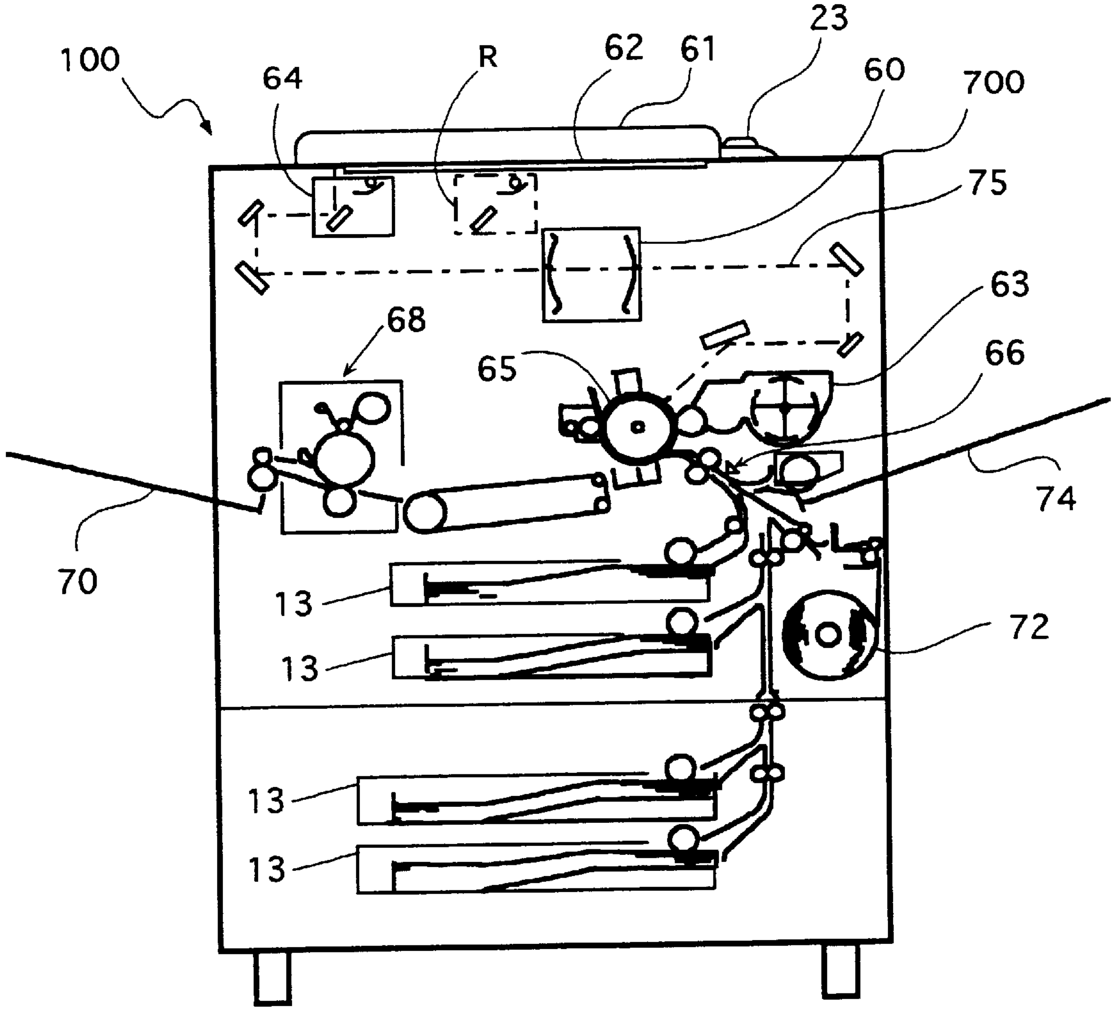
FIG. 5 is a cross sectional view showing a general internal structure of the copying machine shown in FIG. 1.

FIG. 5 shows an internal structure of the copying machine 100. Inside the main body 700 of the copying machine 100, the scanner optical system 64 is located below an original supporting plate glass 62. In the normal mode, this scanner optical system 64 moves back and forth below the original supporting plate glass 62, while, in the sheet through mode, it is positioned fixedly at a read position R. An optical image read by the scanner optical system 64 is forwarded, via an optical system including a lens system 60, to a photosensitive drum (image formation section) 65 to form an electrostatic latent image thereon. This electrostatic latent image is developed with toner in a developing section 63, and the toner image is transferred to a sheet which has been transported. The toner image transferred onto the sheet is heat-fixed by a fixing section 68, and the sheet is ejected onto the copied sheet ejection tray 70. The sheet on which the toner image is transferred is selected from cut sheets supplied from a plurality of front trays 13 or the manual-insertion tray 74 or from a roll of sheet supplied from the roll sheet supply section 17. The selected sheet stands by at a sensor 66 before image formation. The sheet standing by at than position is sent to the transfer area at a timing determined by the operation mode.

Now, an example of the control hardware of the copying machine 100 shown in FIG. 1 is described with reference to FIG. 6. The copying machine 100 comprises the main body 700 and the automatic sheet feeding unit (AF) 600. As described above, the original transporting unit (DF) 61 belongs to the main body 700 which is controlled by a central processing unit (CPU) 701 within the main body 700. Within the automatic sheet feeding unit (AF) 600 is provided a CPU 601 which is separate from the CPU 701.

Figure 6:
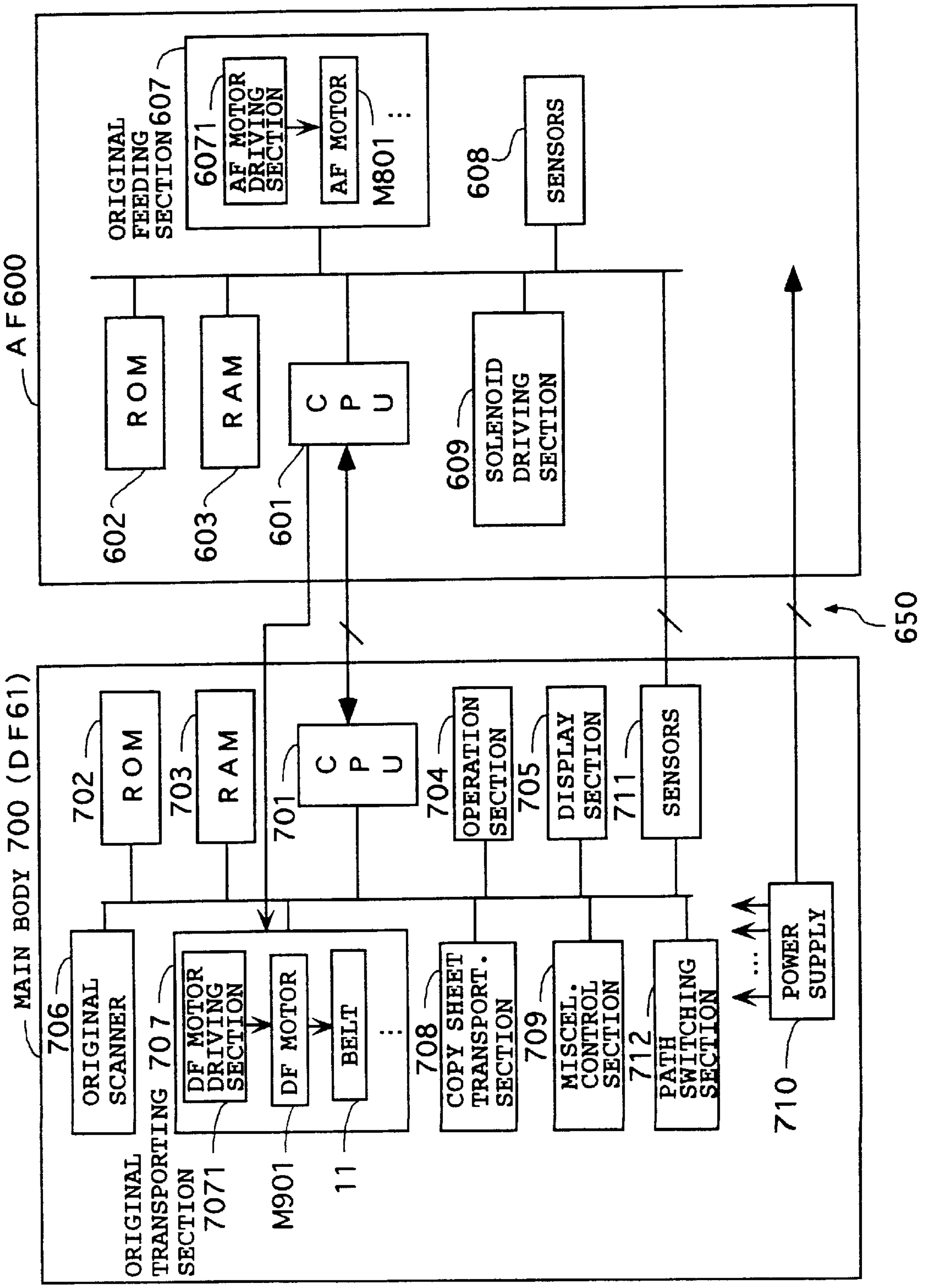
FIG. 6 is a block diagram showing the internal hardware configuration of the copying machine shown in FIG. 1.

More specifically, as shown in FIG. 6, the main body 700 includes the CPU 701, a ROM 702, a RAM 703 , an operation section 704, a display section 705, the original scanner 706, an original transporting section 707, a copy sheet transportation section 708, a miscellaneous control section 709, a power supply 710, a sensors 711, and a path switching section 712.

The ROM 702 is a non-volatile memory in which the programs to be executed by the CPU 701 and associated data are stored. These programs include a control program which controls a plurality of control modes of the original transporting section 707, in which a DF motor which will be described later is included, as well as other control programs. The RAM 703 is used as a work area for the CPU 701 or as a temporary storage area in which various types of data are stored. The operation section 704 and the display section 705 on the operation panel 12 shown in FIG. 1 function as an interface with the user. The original scanner 706 controls the scanner optical system 64 and other components described in FIG. 5.

The original transporting section 707, which has the transportation belt 11, a transportation motor (also called a DF motor) M901 for rotating the transportation belt 11, a DF motor driving section 7071 for driving the transportation motor, various sensors, solenoids, and rollers (see FIG. 15), transports an original either inserted from the original inserting port 23 or passed from the automatic sheet feeding unit (AF) 600 onto the original supporting plate 14, and then ejects the copied original. The copy sheet transportation section 708, with a known configuration, transports a copy sheet. The miscellaneous control section 709, not directly related to the present invention, performs other control functions, such as fixing, necessary for copying machine operations. The power supply 710 supplies power to the components of the main body 700. In this embodiment, power to the AF 600 is also supplied from the main body.

The sensors 711 includes the above-described sensors S1, S2, S3, S4, S5 and so forth. These may be configured using known detection means such as optical or mechanical detection means. The output from some of the sensors 711 may also be referenced from the CPU 601 in the AF 600, which will be described later, when the AF 600 performs the automatic sheet feeding. The path switching section 712 serves as means for switching original switching paths which will be described later. More specifically, it controls a path switching solenoid (SL901 in FIG. 15).

On the other hand, the AF 600 includes the CPU 601, a ROM 602, a RAM 603, an original feeding section 607, sensors 608, and a solenoid driving section 609.

The AF 600 is controlled by the CPU 601. The ROM 602 is a non-volatile memory in which the programs to be executed by the CPU 601 and associated data are stored. These programs include a control program which controls the original feeding section 607 including an AF motor M801 and a control program which controls the original transporting section 707 in the normal mode.

The RAM 603 is used as a work area for the CPU 601 or as a temporary storage area in which various types of data are stored. The original feeding section 607, which includes the AF motor M801, an AF motor driving section 6071 for driving the AF motor, various rollers, solenoids, sensors, and so forth (see FIG. 15), picks up originals, one at a time, from a plurality of originals stacked on the automatic sheet feeding unit 600, and successively passes them to the original transporting unit 61. The sensors 608 include a sheet through sensor S11, an AF original input sensor S12 which detects that an original is entered into the AF 600, a second sheet ejection sensor S6, and so forth. These sensors may also be configured with known detection means. The solenoid driving section 609, which serves as driving means associated with the automatic sheet feeding, drives a pickup solenoid, a separating solenoid, an entry shutter solenoid, and so on.

In this embodiment, the original transporting section 707 of the main body 700 is controlled by the CPU 701 when the automatic sheet feeding unit (AF) 600 is not installed. The AF 600 requires a motor, for example, to pick up originals. Therefore, when AF 600 is installed, the load on the CPU 701 is too heavy if the main body 700 must also control the automatic sheet feeding (controls the AF motor M801). To solve this problem, the AF 600 has the CPU 601 which is provided as its own control means (second control means). At this time, to prevent the control performed by the AF 600 from conflicting with the control performed by the CPU 701 of the main body 700, the CPU 601 of the AF 600, not the CPU 701, controls the original transporting section 707 when the AF 600 performs the automatic sheet feeding. However, even when the AF 600 is installed, the CPU 701 of the main body controls the original transporting section 707 when a single original (for example, a long sheet) inserted from the second sheet feeding port 302 is copied. This is because the copying of a single sheet can be performed with the same original transportation control as used when only the original transporting unit (DF) 61 is installed, without using the special mechanism of the AF 600.

The main body 700 and the AF 600 are electrically connected by a set of signals 650 as in a cable.

Figure 7:
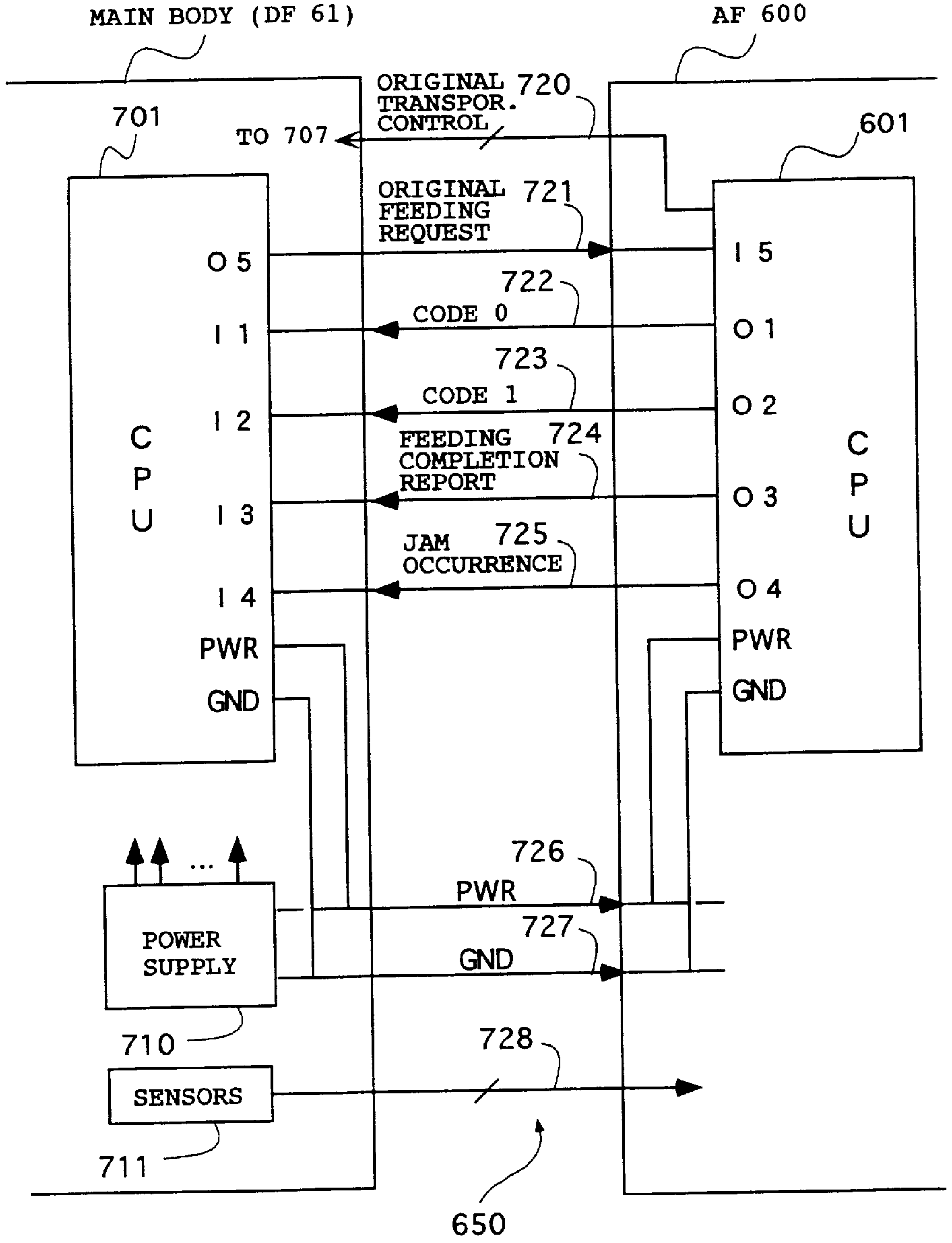
FIG. 7 is a diagram showing an interface between the main body of the copying machine shown in FIG. 6 and the automatic sheet feeding unit (AF)

An example of the set of signals 650 is described with reference to FIG. 7. The set of signals 650 comprises signals, such as an original transportation control signal 720, an original feeding request signal 721, a code 0 signal 722, a code 1 signal 723, a feeding completion report signal 724, and a jam occurrence signal 725, a power supply line (PWR) 726, a ground line (GND) 727, and output signals 728 from the sensors 711.

The original transportation control signal 720 is a signal which controls the original transporting section 707 from the AF 600 when the AF 600 performs successive original feeding operation. The original feeding request signal 721, which is a signal output from an output terminal O5 of the CPU 701 of the main body 700 to an input terminal I7 of the CPU 601 of the AF 600, is output when a new original feeding request is issued from the main body 700 to the AF 600. The feeding completion report signal 724, which is issued from an output terminal O3 of the CPU 601 to an input terminal I3 of the CPU 701, is output when the AF 600 has fed an original in response to an original feed request from the main body 700. Two signal lines, a code 0 signal 722 and a code 1 signal 723, which are connected from output terminals O1 and O2 of the CPU 601 to input terminals I1 and I2 of the CPU 701 respectively, are used to send a version number signal of the AF 600, an original size signal, a jam occurrence type signal, etc. The jam occurrence signal 725, which is output from an output terminal O4 of the CPU 601 to an input terminal I4 of the CPU 701, informs the main body 700, when the AF 600 detects a jam of an original based on the output from the sensors 711 described above, that the jam has occurred. The power supply line (PWR) 726 is a line through which power is supplied from the main body 700 to the OF 600. The ground line (GND) 727 is a line for providing the ground potential common to the signals and the power supply to the AF 600. When the code 0 and code 1 signals 722 and 723 are used to send the version signal of the AF 600 (version number stored in the ROM 602), the synchronization signal is sent on the code 0 signal 722 while serial data indicating the version number is sent on the code 1 signal 723. The version number of the AF 600 is a number assigned when the function of the AF 600 is changed, when the program in the ROM 602 is changed, and so on. The version number used in this embodiment is an 8-bit binary number.

FIGS. 8 (*a*) and (*b*) show examples of the code 0 and code 1 signals 722 and 723. The code 1 and code 2 lines may be used for other purposes as the case may be.

FIG. 8 (*a*) shows a case where the code 0 and code 1 signals 722 and 723 are used to inform the main body 700 of the type of jam jam location, cause of jam, etc.) when an original jam has occurred. FIG. 8 (*b*) shows a case where the code 0 and code 1 signals 722 and 723 are used to inform the main body 700 of the size of the original automatically fed. In this embodiment, the user may select the size of original from the AB-size system mode and the inch-size system mode.

In FIG. 8 (*a*), when code 1 and code 0 are both "L", it is indicated that an originals was inserted from the second sheet feeding port 302 while the AF 600 was performing the successive automatic sheet feeding from the first sheet feeding port 301, i.e., a "simultaneous original insertion jam" has occurred. When code 1 is "L" and code 0 is "H", it is indicated that a jam has occurred in the sheet ejection sensor (S5 and S6 in FIG. 15). When code 1 is "H" and code 0 is "L", it is indicated that a jam has occurred in the sheet leading-edge sensor S3. When both code 1 and code 0 are "H", it is indicated that a jam has occurred in the original input sensor S1. These jams may be detected based on the output from the corresponding sensor. For example, a delay jam is detected when the original does not arrive at the sensor even after an expected time has elapsed, or a stay jam is detected when the sensor remains on longer than expected.

In FIG. 8 (*b*), when code 1 and code 0 are both "L", it is indicated that the size is A3S or 12×18S. The former is a size in the AB-size system mode, while the latter is a size in the inch-size system mode. When code 1 is "L" and code 0 is "H", it is indicated that the size is B4S or 11×17S. When code 1 is "H" and code 0 is "L", it is indicated that the size is A4S. When code 1 and code 0 are both "H", it is indicated that the size is B5S, legal S, or letter S.

Each of the number of types of jam and the number of sizes of original shown in FIG. 8 (*a*) and FIG. 8 (*b*) is four. It should be noted that the number may be three or less and that the contents may be changed. Conversely, the number of bits may be increased to represent more items.

Figure 9:
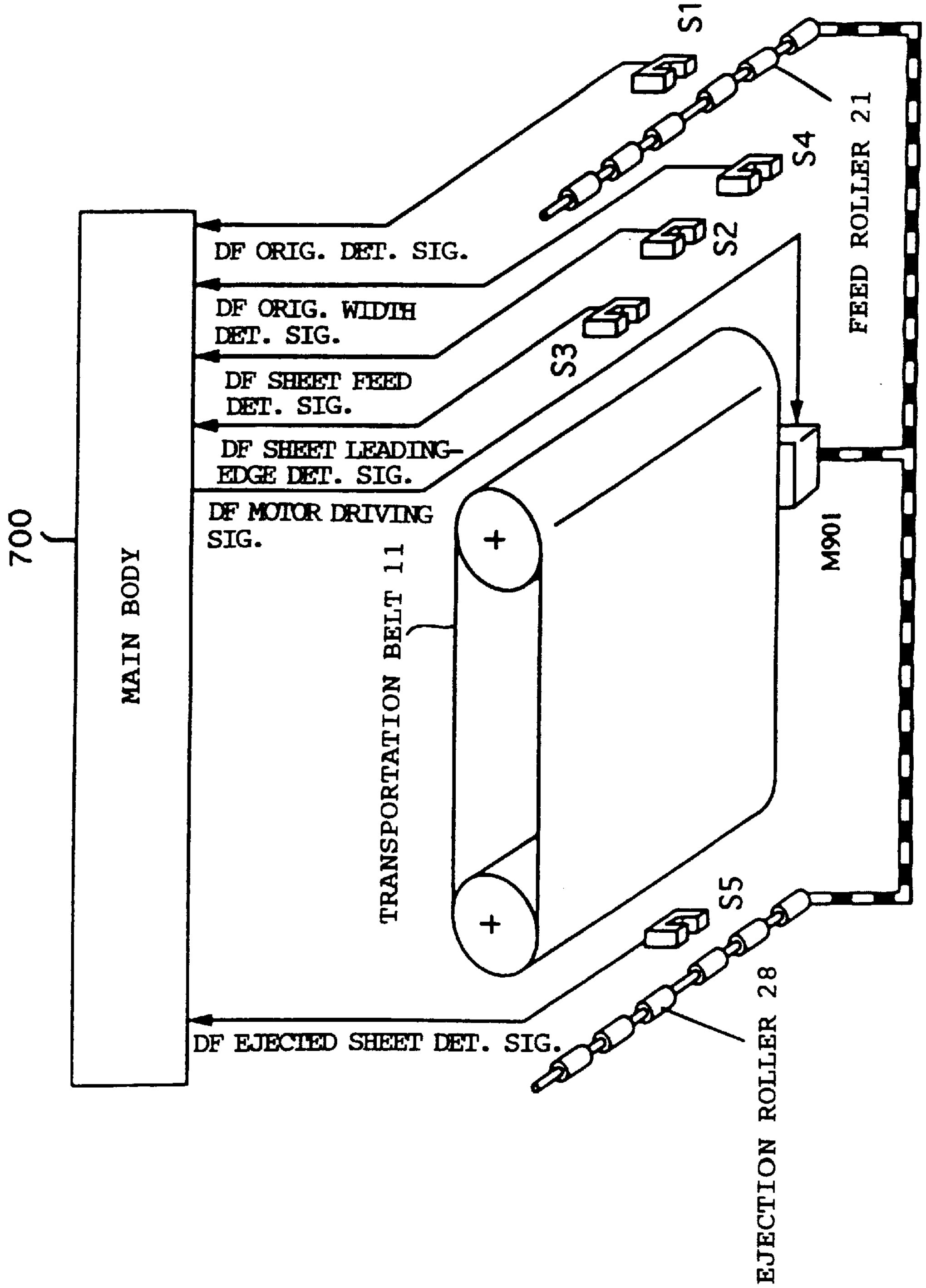
FIG. 9 is a diagram showing the mechanism of the original transporting unit (DF)
Figure 10A:
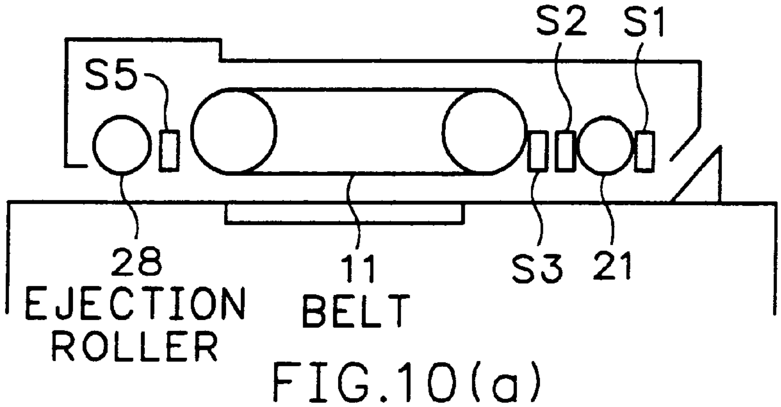
FIGS. 10(*a*)–(*f*) are diagrams showing an operation of the original transporting unit (DF) in a normal mode.
Figure 10B:
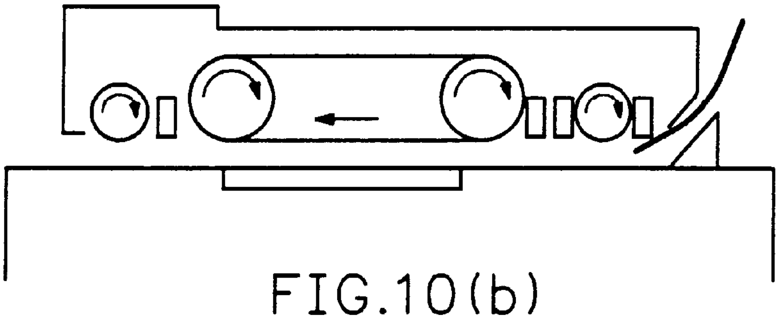
Figure 10C:
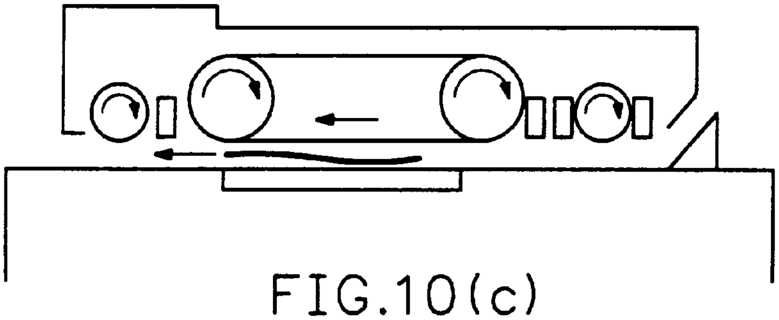
Figure 10D:
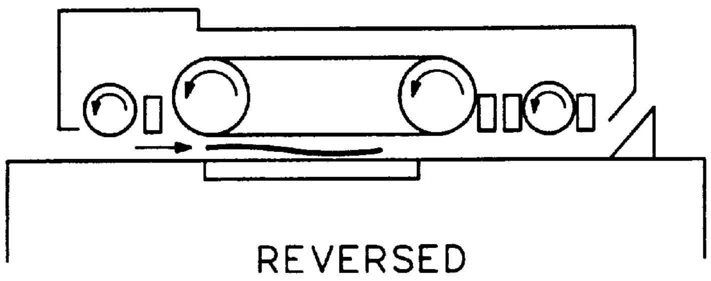
Figure 10E:
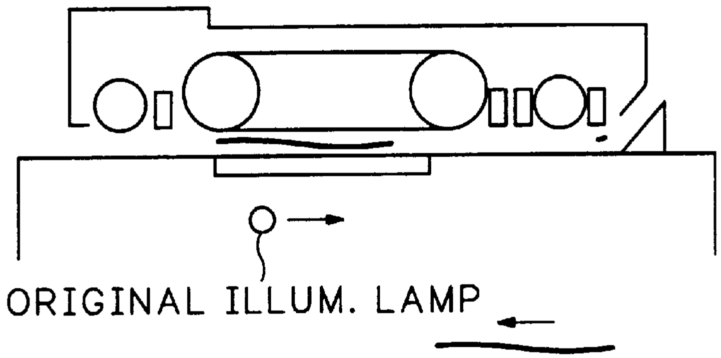
Figure 10F:
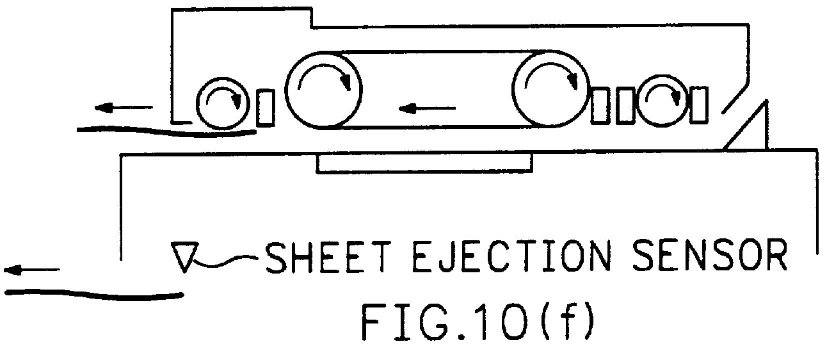

FIG. 9 illustrates a mechanism of the original transporting unit (DF) 61. The DF 61, which comprises the transportation belt 11, a DF motor M901, a feed roller 21, an ejection roller 28, various sensors S1 to S5, and so on, basically operates under control of the CPU 701 of the main body 700. Upon receiving the output from various sensors, the main body 700 controls the DF motor M901. The rotation of the DF motor M901 is transmitted to the transportation belt. 11, the feed roller 21, and the ejection roller 28. The rotation speed of the DF motor M901 determines the running speed of the transportation belt 11.

FIGS. 10 (*a*)–(*f*) illustrate the normal mode operation of the DF 61.

An original is inserted from the original inserting port 23 of the FD 61 in the condition shown in FIG. 10 (*a*).

In this condition, the original is detected by the original input sensor S1. And, in about one second, the DF motor M901 is rotated in the forward direction at a low speed to start transporting the original (b). That is, the feed roller 21 starts rotating to take the original into the machine. When the leading edge of the original is detected by the sheet feed sensor S2, the roller stops and waits for the user to give the copy start instruction. When a "auto-start" mode has been set up by the user, the roller does not stop but continues feeding the original.

When the original is transported onto the original supporting plate and its leading edge reaches the sheet ejection sensor S5. the DF motor M901 is stopped (c). Immediately after that, the rotation of the DF motor M901 is reversed to set the original in position on the original supporting plate (d). This is done to set the leading edge of the original at the predetermined position precisely.

With the original in this position, the scanner optical system 64 scans the original to start the copy operation (e). In parallel with this operation, a copy sheet is transported, within the main body of the copying machine, to the image transfer section. When the copy sheet passes through the sheet ejection sensor (not shown in the figure) of the main body 700, the DF motor M901 is rotated in the forward direction to eject the original (f).

Figure 11:
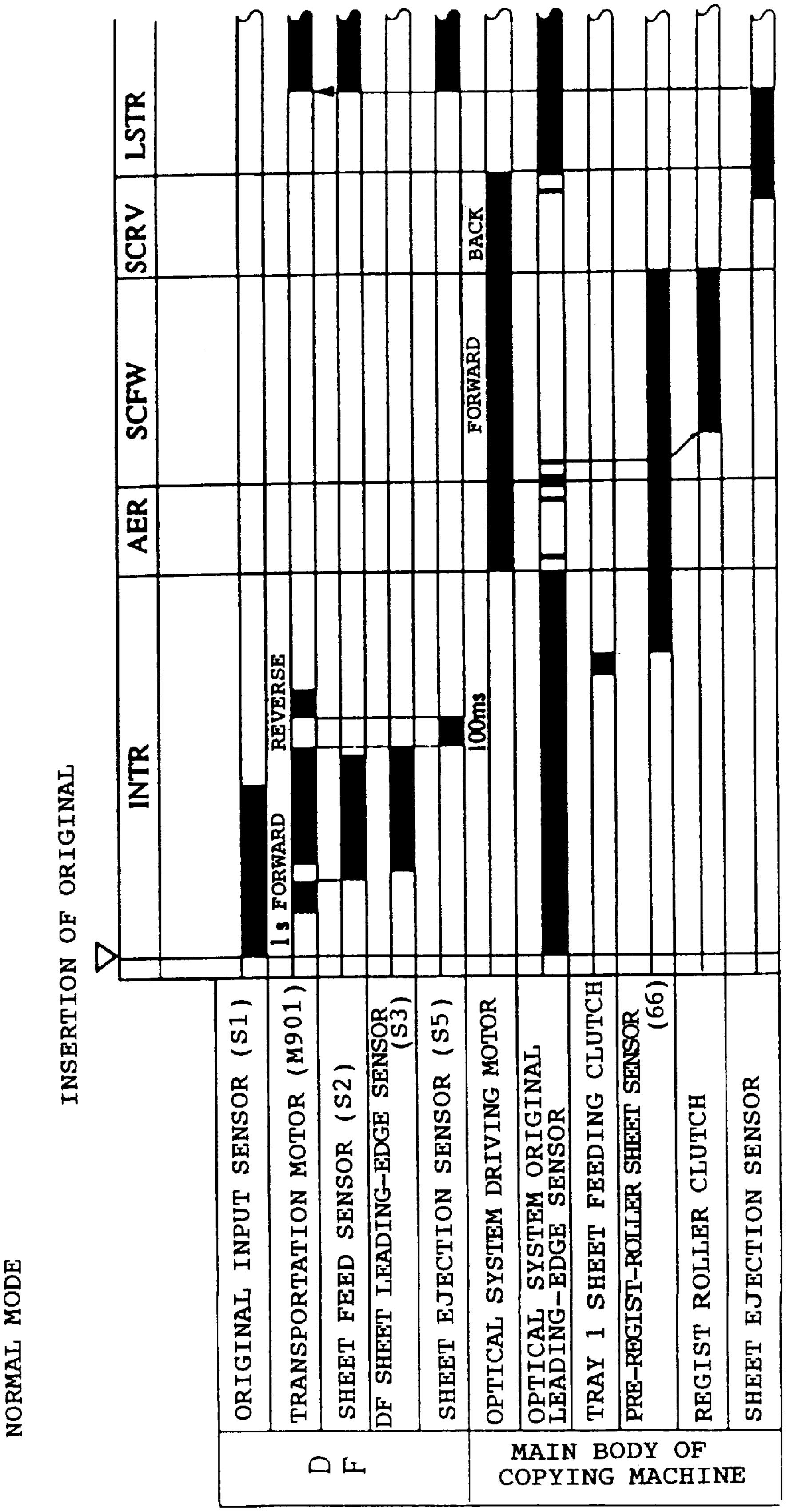
FIG. 11 is a diagram showing an operation sequence of the original transporting unit (DF) in the normal mode shown in FIGS. 10 (*a*)–(*f*) and that of the elements in the copying machine.
Figure 12A:
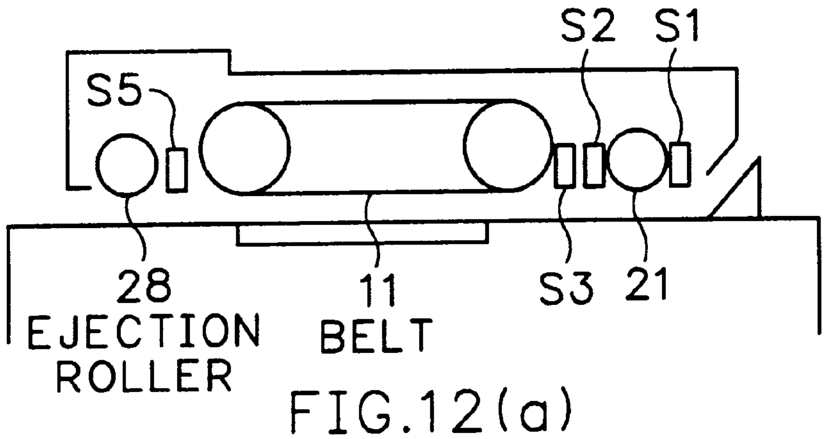
FIGS. 12 (*a*)–(*f*) are diagrams showing an operation of the original transporting unit (DF) in a sheet through mode.
Figure 12B:
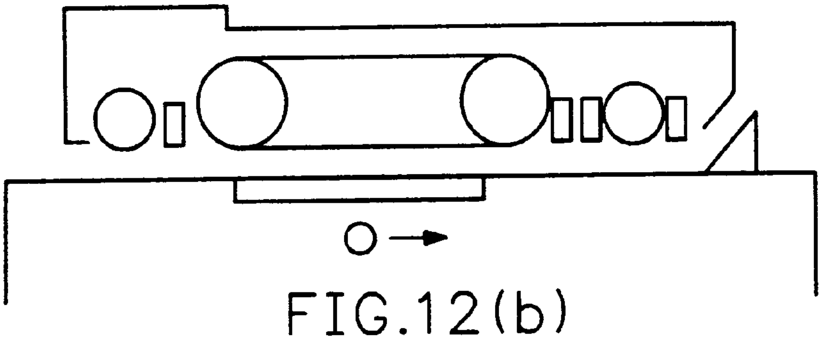
Figure 12C:
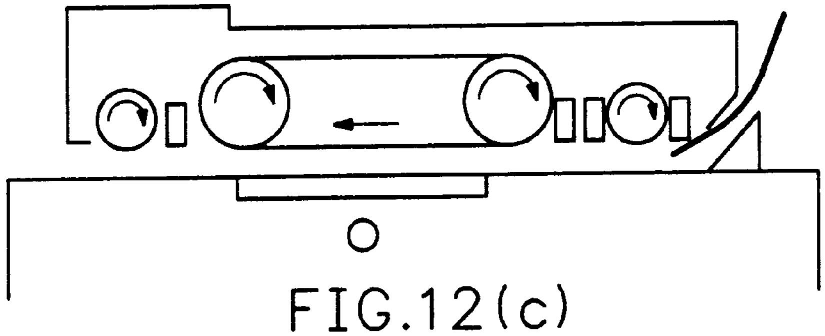
Figure 12D:
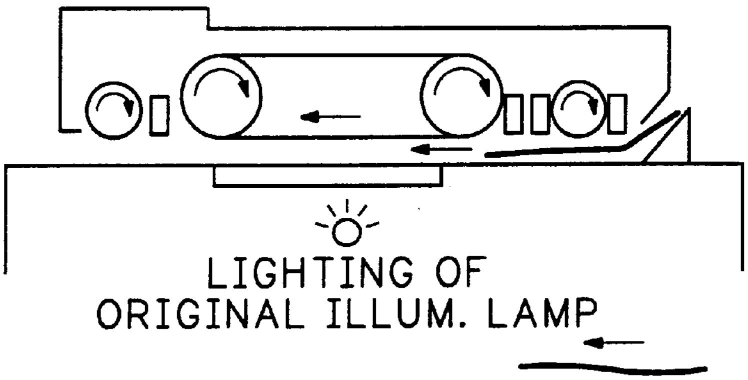
Figure 12E:
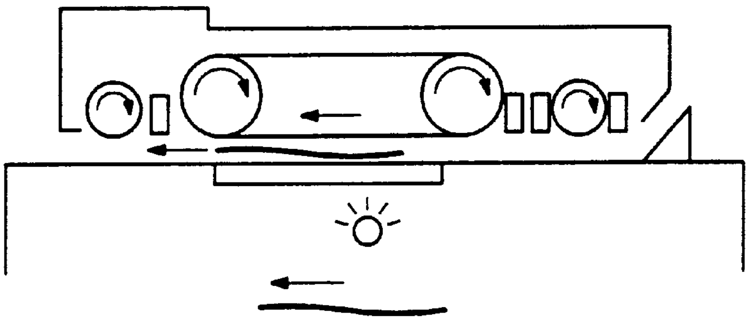
Figure 12F:
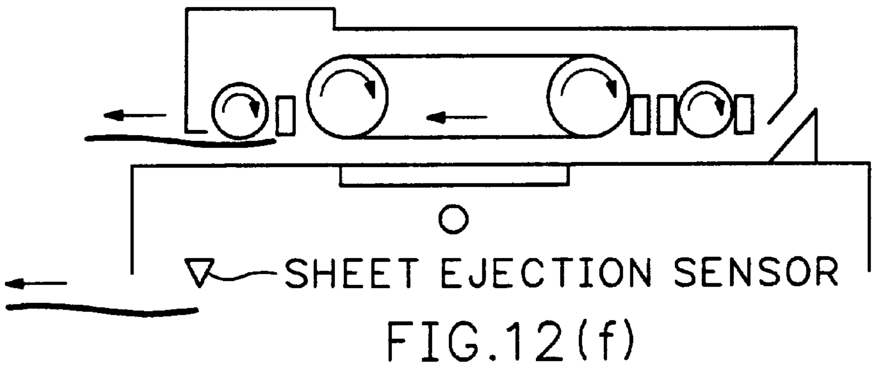

FIG. 11 is a diagram showing an operation sequence of various elements in the DF 61 and the main body 700 in the normal mode shown in FIGS. 10 (*a*)–(*f*). This diagram shows the timing in which the elements operate. In the figure, INTR is an introduction stage in which an original is transported to, and set at, the predetermined position on the original supporting plate. AER is a stage in which the scanner optical system 64 performs a partial exposure scan operation to measure the density of the original. This stage corresponds to a time period for the scanner optical system 64 to move forward by 10 cm and then back to the home position. This AER stage is used only when the automatic density mode is set up. SCFW is a stage in which the scanner optical system 64 is moved forward to read the original. This stage corresponds to a time period during which the original is illuminated by the original illumination lamp and its reflected light is projected onto the photosensitive drum via the mirror and the lens. SCRV is a stage in which the scanner optical system 64 is moved back. This stage corresponds to a time period for the optical system to return to the home position for the next copy operation. LSTR is a stage of a post-rotation to eject the original and the sheet. The "optical system driving motor" located inside the main body 700 of the copying machine shown in FIG. 11 is a motor (not shown in the figure) for controlling the movement of the scanner optical system 64. The "optical system original leading-edge sensor", which is a sensor located at the original leading edge position near the optical system home position, is used to detect that the scanner optical system 64 is positioned at the original leading edge position. The "tray 1 sheet feeding clutch" is a clutch (not shown in the figure) for controlling the sheet feeding of a copy sheet in a tray 1, and the "pre-regist-roller sheet sensor" corresponds to the sheet leading-edge sensor 66 described above. The "regist (registration) roller clutch" is a driving section (not shown in the figure) which starts to transport the sheet standing by at the pre-regist-roller sheet sensor position when the clutch is turned on. The "sheet ejection sensor" (see FIG. 10 (*f*)) is a sensor which detects that the sheet has been ejected.

Next, an operation of the DF 61 in the sheet through mode is described with reference to FIGS. 12 (*a*)–(*f*).

The sheet through mode is set up by pressing the "sheet through key" (not shown in the figure) on the operation section 704 (a). In response to this, the scanner optical system 64 is moved to the predetermined fixed position (sheet through position) below the original supporting plate (b). After that, when a user inserts an original into the original inserting port 23 and the original input sensor S1 detects that the original has been inserted, then in about one second, the DF motor M91 starts rotating in the forward direction at a low speed (c). That is, the feed roller 21 starts rotation to pull the original inside. The leading edge of the original passes through the sheet feed sensor S2 to turn on the sheet leading-edge sensor S3 and, after a specified time (which depends on a scale factor), the regist roller clutch (not shown in the figure) within the main body is turned on.

The sheet transportation operation is started when the leading edge of the original reaches the sheet leading-edge sensor S3 (d). The original which passes through the sheet leading-edge sensor S3 is transported to the original supporting plate 14 by the transportation belt 11 rotating around a pair of pulleys 24 and 25 (e). After the original turns on the sheet leading-edge sensor S3, the original is transported at a speed determined by the scale factor. Immediately before the trailing edge of the original passes through the sheet ejection sensor S5, the transportation speed is changed to the speed for 100%-copy and then the original is ejected (f). This is to reduce the transportation time when the scale factor is high, and to reduce the speed at which the original is ejected rapidly to the sheet ejection tray when the transportation speed is low.

Figure 13:
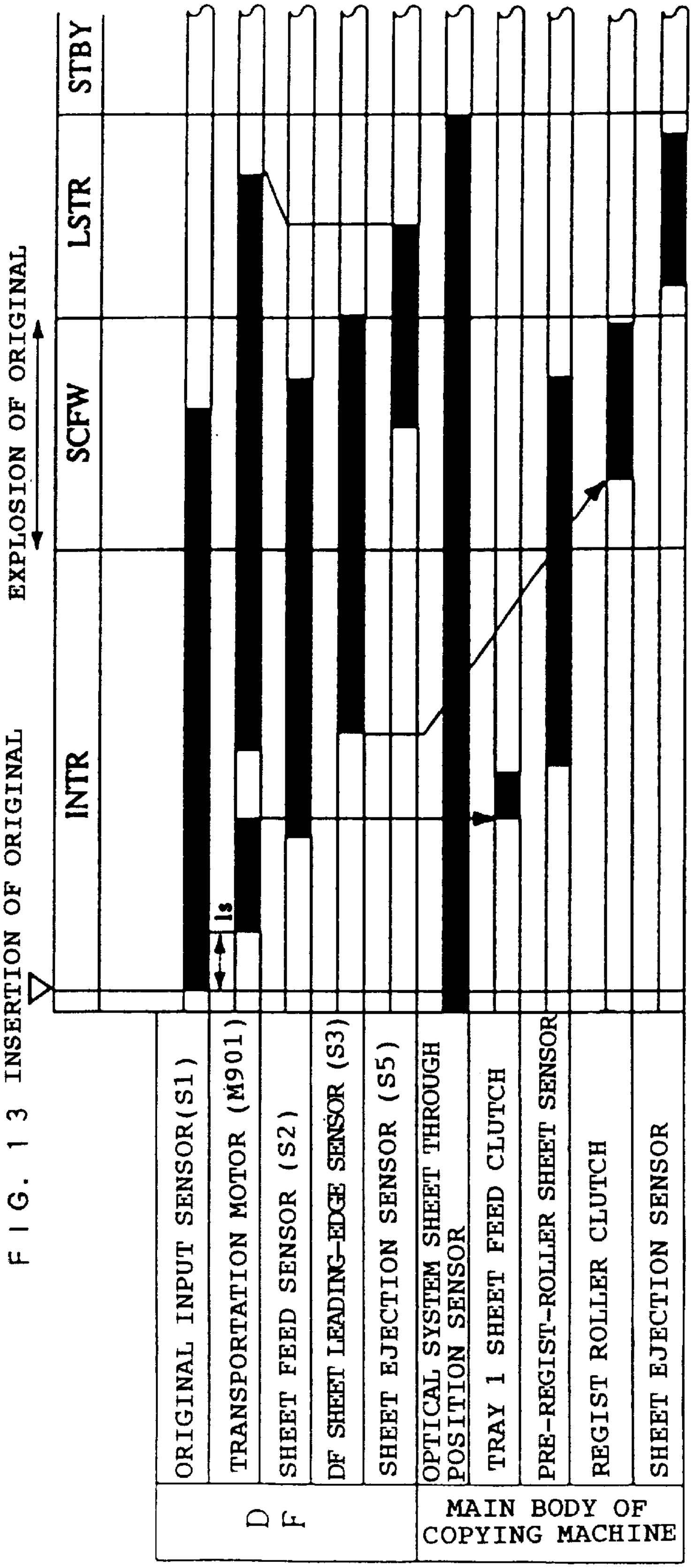
FIG. 13 is a diagram showing an operation sequence of the original transporting unit (DF) in the sheet through mode shown in FIGS. 12 (*a*)–(*f*) and that of the elements in the copying machine.

FIG. 13 is a diagram showing an operation sequence of various elements of the DF 61 and the main body 700 of the copying machine in the sheet through mode shown in FIGS. 12(*a*)–(*f*). The operation goes through the INTR, SCFW, and LSTR stages and then enters a stand-by state STBY. Because there is no SCRV stage that is shown in FIG. 11, the time required for the copy operation is reduced. In the sheet through mode, the scanner optical system 64 does not move for scanning but is fixed at the SCFW stage, as described above. The moving speed of the original in the SCFW stage varies according to the scale factor of the original. That is, the larger the scale factor is, the slower the original moves. The "optical sheet through position sensor" is a sensor (not shown in the figure) used to confirm that the scanner optical system 64 is positioned at the sheet through position.

FIG. 14 shows sizes of originals that are detected by the various sensors provided in the DF 61. The size of an original in the feed direction is measured in terms of output pulses to drive the DF motor M901 while the original passes through the sheet leading-edge sensor S3. The width of an original is detected by the size detection sensor S4 (FIG. 9) located at the predetermined position in the path for the original. The size of the original is found based on the measured values as shown in FIG. 14. The sizes of an original shown in FIG. 8 (*b*), which are part of the original sizes shown in FIG. 14, correspond to those used when the AF 600 is installed.

Figure 15:
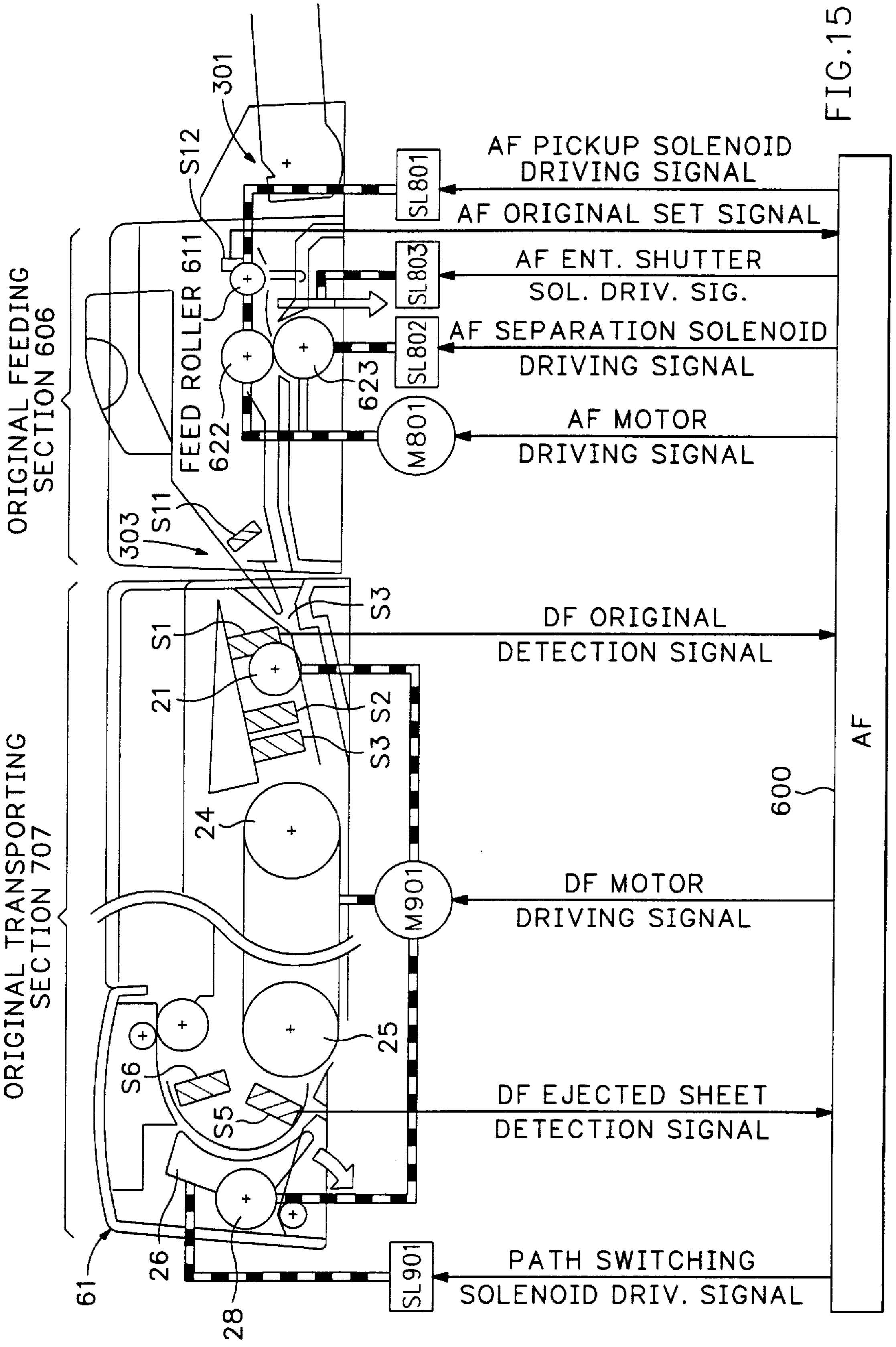
FIG. 15 is a diagram showing the mechanism in which the original transporting unit (DF) and the automatic sheet feeding unit (AF) work together.

FIG. 15 shows a structure of the mechanism of the DF 61 and the AF 600 which are coupled with each other.

The AF 600, which is an automatic sheet feeding unit, comprises the AF motor M801, a pickup solenoid SL801, a separation solenoid SL802, an entrance shutter solenoid SL803, a feed roller 611, a transportation roller 622, and a separating roller 623. In addition, the AF 600 includes a sheet through sensor S11 and an original input sensor S12 among the sensors 608 described above. The original input: sensor 512 is used for the automatic sheet feeding operation, while the sheet through sensor S11 is used to detect the "simultaneous original insertion jam" described earlier.

Figure 17:
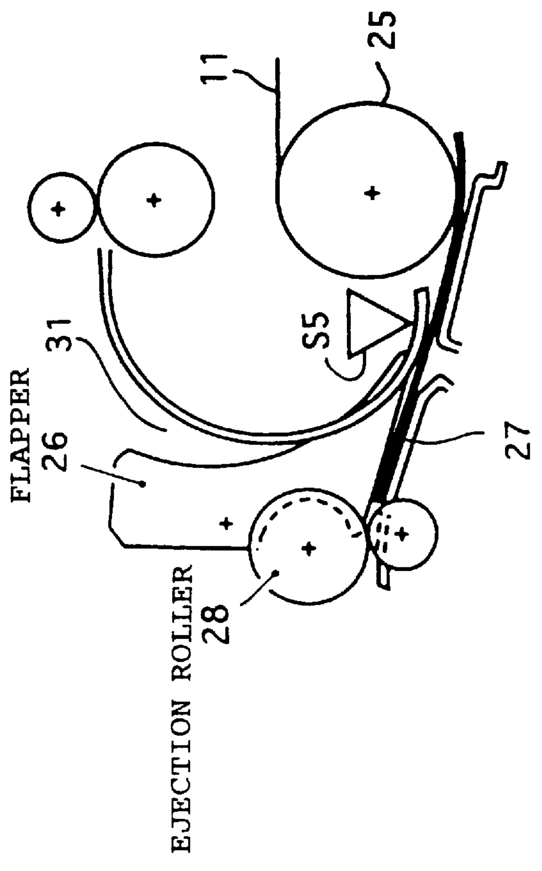
FIGS. 17 (*a*) and (*b*) are diagrams showing two sheet ejection paths in the original transporting unit (DF)
Figure 17:
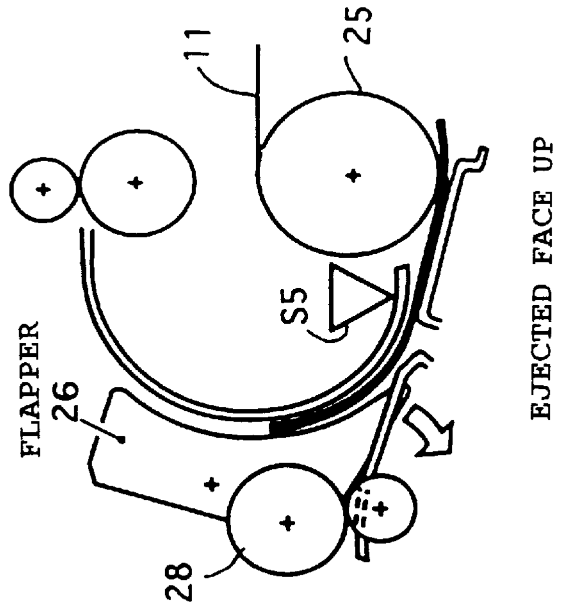

When the copy start key is pressed, the CPU 701 in the main body 700 issues an original feeding request signal 721 (FIG. 7) and, in response to this the CPU 601 in the AF 600 starts a sheet feeding operation. First, the entrance shutter solenoid SL803 is turned on to lower the entrance shutter to open the first sheet feeding port 301. Immediately after that, the pickup solenoid SL801 is turned on to lower the feed roller 611 so that the feed roller comes into contact with the original. Then, the AF motor M801 is turned on, and the feed roller 611, transportation roller 622, separating roller 623, and original input sensor S12 work together to picks up one original and send it to the original inserting port 23 of the DF 61. The number of rotations of the AF motor M801, detected by a clock sensor (not shown in the figure), is used to control the rotation of the AF motor M801. When the original from the AF 600 is then inserted into the original inserting port 23 of the original transporting section 707, the original input sensor S1 of the DF is turned on. This starts the DF motor M901. At the same time, the separation solenoid SL802 of the AF is turned on to release the pressure of the separating roller 623 so that the original is transported. The subsequent original transposition operation of the DF 61 is the same as that performed in the normal operation mode described in FIG. 11. In this embodiment, however, the original ejection path is switched to the upper sheet ejection path 31 as shown in FIGS. 17 (*a*) and (*b*). One original is transported to the predetermined position on the original supporting plate, the original is copied and, after the copy operation, the original is ejected. Then, the next original is fed as the next original feed request is issued from the CPU 701.

Figure 16:
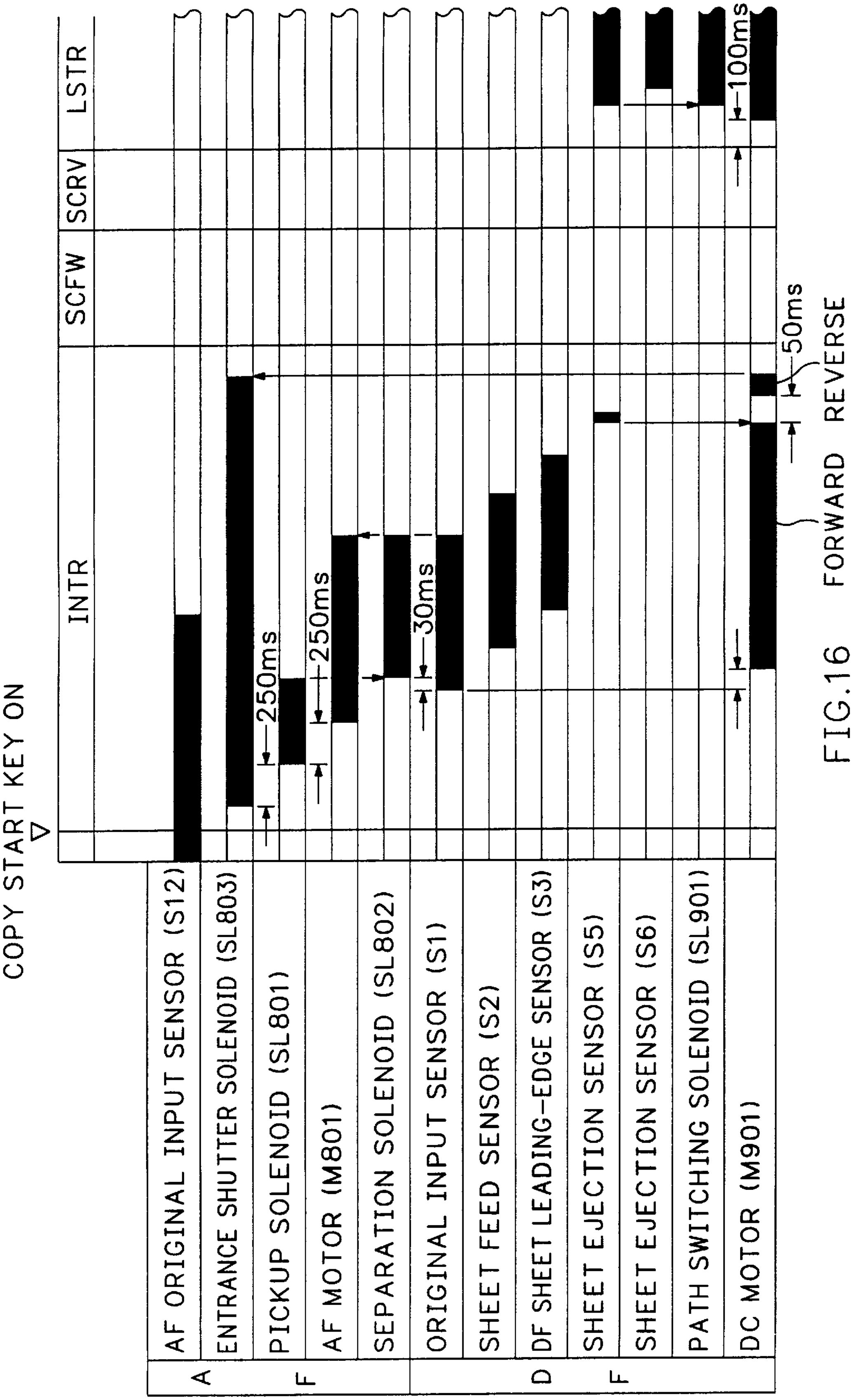
FIG. 16 is a diagram showing a basic sequence of the successive automatic sheet feeding operation.

FIG. 16 shows a basic sequence of the successive automatic sheet feeding operation. In this figure, the elements of the main body 700 are omitted for convenience.

The sheet through sensor S11, described above, is provided in the original path of the second sheet feeding port 302 of the AF 600, through which a single original is inserted, to allow the original inserted into the second sheet feeding port 302 to be detected. The original inserted from the second sheet feeding port 302 is transported just as the original is transported when only the DF 61 is installed. In this case, the successive automatic sheet feeding operation mechanism is not used at all in the AF 600 and, therefore, the original transportation operation of the DF 61 is controlled by the main body 700 in this embodiment as described above.

FIGS. 17 (*a*) and (*b*) illustrate the two sheet ejection paths of the DF 61. As described in FIG. 4 briefly, the DF 61 has the first sheet ejection path 31 via which the original is reversed (with face up) and the second sheet ejection path 27 via which the original is not reversed. In addition, the DF 61 includes the path switching pawl (flapper) 26 and the path switching solenoid SL901 (FIG. 15) for driving the path switching pawl. The AF 600 controls the path switching solenoid SL901 to switch the path switching pawl 26 so that the first sheet ejection path is selected when the sheet ejection sensor S5 is turned on. That is, when successive automatic sheet feeding is performed by the AF 600, the copied original is guided by the path switching pawl 26, which also serves as a guide, into an original ejection tray 32 provided on the top of the DF 61. This reverses the original and, therefore, ejects a plurality of originals in the order they were stacked.

When the DF 61 is used solely or when the second sheet feeding port 302 of the AF 600 is used, the first sheet ejection path 27 is selected and, with the ejection roller 28, the original is ejected onto the original ejection tray 15 (FIG. 1).

Figure 18:
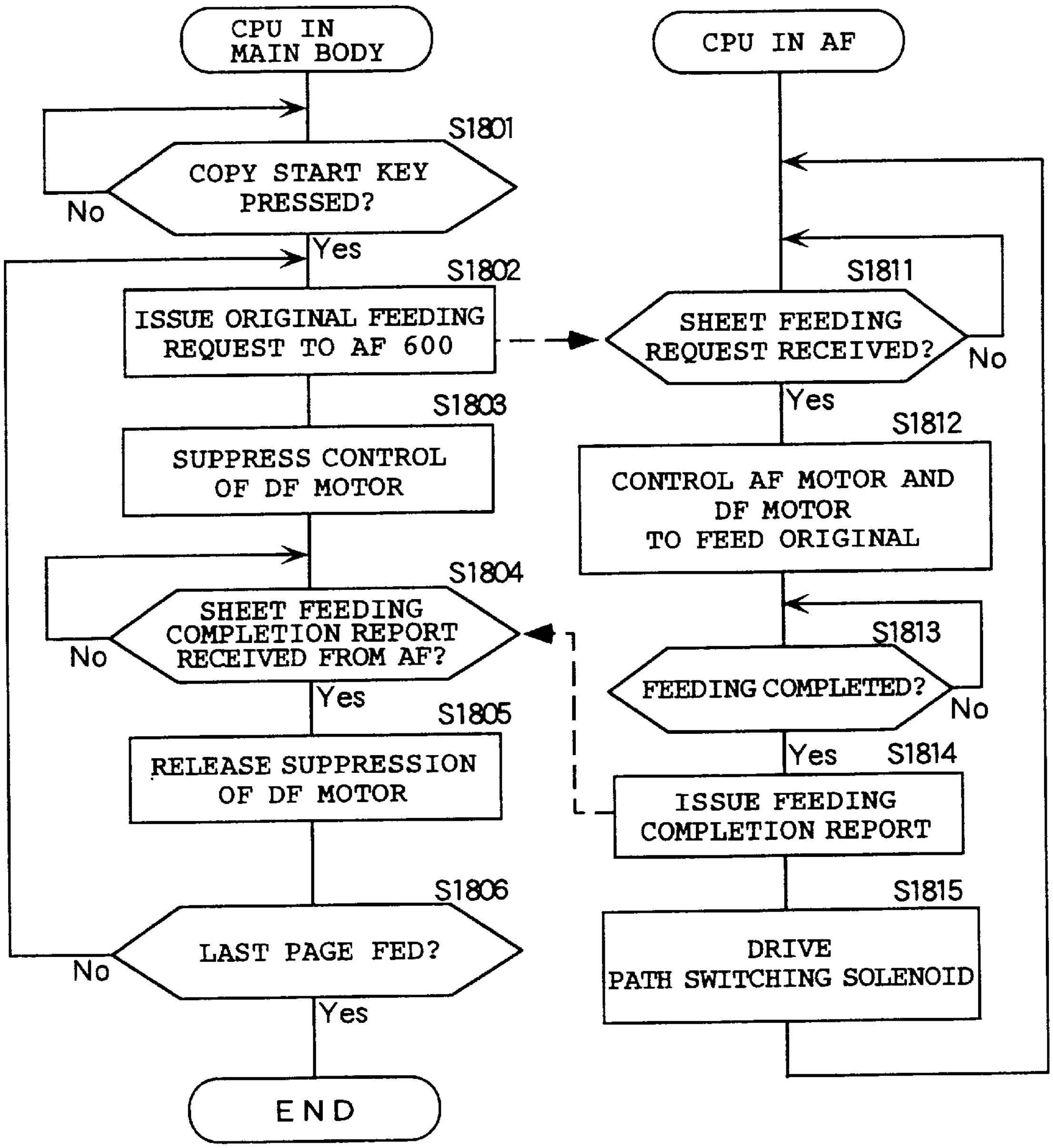
FIG. 18 is a flowchart showing an outline operation of the CPU in the main body and the CPU in the AF when the successive automatic sheet feeding operation is performed by the automatic sheet feeding unit (AF).

Finally, FIG. 18 shows a flowchart outlining the processing of the CPU 701 and the CPU 601 when successive automatic sheet feeding through the second sheet feeding port 302 on the AF 600 is performed.

When a user presses the copy start key (S1801), the CPU 701 of the main body issues an original feeding request 721 (FIG. 7) to the AF 600 (S1802). Then, the CPU suppresses the control of its own DF motor M901 (S1083).

Upon receiving the original feeding request 721 from the CPU 701 of the main body (S1811), the CPU 601 of the AF controls the original feeding section 607, which includes the AF motor 801, and the original transporting section 707, which includes the DF motor M901, to feed and transport the original (S1812). When the feeding of the original is completed (S1813), the CPU 601 of the AF sends back a feeding completion report 724 (FIG. 7) to the CPU 701 of the main body (S1814). After that, the CPU 601 of the AF turns on the path switching solenoid SL901, based on the output from the sheet ejection sensor S5, to select the sheet ejection path 31 and ejects the original (S1815).

Upon receiving the feeding completion report 724 from the CPU 601 of the AF (S1804), the CPU 701 of the main body releases the suppression of the control of its own DF motor (S1805). Then, based on the output from the original input sensor S12 of the AF, the CPU checks if all the pages have been copied (S1806) and, if not, repeats the above processing until the last page is copied.

In the processing shown in FIG. 18, the main body suppresses and releases the control of the DF motor M901 each time an original is fed. In other words, because the main body is normally permitted to perform the control operation, the CPU 701 of the main body may control the DF rotor M901 without using the CPU 601 of the AF when an original is inserted from the second sheet feeding port 302.

Instead of, or in addition to the CPU 701 suppressing the control of the DF motor M901, a switch means may be provided to block the driving signal of the DF motor M901 sent from the main body so that the CPU 601 of the AF can control this switch means.

According to the present invention, both the successive automatic sheet feeding operation and the sheet through operation are possible with an automatic sheet feeding mechanism installed on a copying machine.

Furthermore, with a configuration that two functions (original feeding and transporting functions) are performed by two separate units and the original transportation is controlled from the main body of the copying machine, it is possible to realize a standard configuration machine at a low cost with the automatic sheet feeding unit available as an option.

In addition, the first and second sheet feeding ports on the automatic sheet feeding unit allow the user to switch between the successive sheet feeding mode and the single sheet feeding mode (especially, sheet through mode) simply by changing the sheet feeding port into which an original is inserted.

Although the invention has been described in its preferred form, various changes and modifications can be made without departing from the spirit and scope of thereof.

Industrial Applicability

The present invention may be used for a copying machine having an original transporting unit and an automatic sheet feeding unit.

I claim:

1. A copying machine in which an original scanner below an original supporting plate moves relatively with respect to an original on said original supporting plate to scan and copy the original, said copying machine comprising:

a copying machine main body having the original supporting plate on which the original is placed;

an original transporting unit having an original inserting port for transporting the original inserted into the original inserting port onto said original supporting plate, said original transporting unit being installed on said copying machine main body;

first control means included in said copying machine main body for controlling an original transportation operation of said original transporting unit; and an automatic sheet feeding unit including automatic sheet feeding means for successively feeding a plurality of originals into said original inserting port and second control means for controlling the original transportation operation of said original transporting unit during an operation of the automatic sheet feeding means, said first control means being suppressed from controlling the original transportation operation during the operation of said automatic sheet feeding means, said automatic sheet feeding unit being optionally installed on said copying machine main body.

2. The copying machine according to claim 1, wherein said original transporting unit also serves as a cover of the original supporting plate, said cover being selectively closed and opened on the original supporting plate.

3. The copying machine according to claim 2, further comprising a sheet feed roller for holding the original between said cover of the original supporting plate and said copying machine main body and for transporting the original, said cover being selectively opened and closed, said sheet feed roller provided at the original inserting port of said original transporting unit.

4. The copying machine according to claim 2, wherein said original transporting unit has an endless transportation belt which rotates in contact with said original supporting plate and a first motor for driving the transportation belt.

5. The copying machine according to claim 1, wherein said original transporting unit has an endless transportation belt which rotates in contact with said original supporting plate and a first motor for driving the transportation belt.

6. The copying machine according to claim 5, wherein said automatic sheet feeding unit has an original separating means for separating the originals, one at a time, from a stack of said plurality of originals and a second motor for driving said original separating means.

7. The copying machine according to claim 1, wherein said first control means has a first operation mode in which said original scanner is moved with respect to the original on said original supporting plate to read the original and a second operation mode in which said original scanner is fixed at a predetermined position below said original supporting plate and in which the original inserted from said original inserting port is moved with respect to the fixed original scanner to read the original.

8. The copying machine according to claim 7, wherein said automatic sheet feeding unit has a first sheet feeding port through which said plurality of originals are successively fed, a second sheet feeding port through which a single original is fed, and first and second original sensors for detecting that the original is inserted from the first and second sheet feeding ports, respectively, wherein said second control means controls said original transporting unit when said first original sensor detects that the original has been inserted from said first sheet feeding port, and wherein said first control means controls said original transporting unit when said second original sensor detects that the original has been inserted from said second sheet feeding port.

9. The copying machine according to claim 8, wherein said original transporting unit has a first sheet ejection path via which the original is reversed, a second sheet ejection path via which the original is not reversed, and a sheet ejection path switching means for switching between the first ejection path and the second sheet ejection path and wherein said second control means requests said sheet ejection path switching means to select said first sheet ejection path according to an output from said first original sensor.

10. The copying machine according to claim 8, wherein said second sheet feeding port is provided as a gap between said original transporting unit and said automatic sheet feeding unit.

* * * * *